United States Patent
Asano et al.

(10) Patent No.: US 7,346,236 B2
(45) Date of Patent: Mar. 18, 2008

(54) COLLIMATOR LENS, FIBER COLLIMATOR AND OPTICAL PARTS

(75) Inventors: Kenichiro Asano, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 259 days.

(21) Appl. No.: 10/116,409

(22) Filed: Apr. 2, 2002

(65) Prior Publication Data
US 2002/0168140 A1    Nov. 14, 2002

(30) Foreign Application Priority Data
Apr. 3, 2001    (JP)    ............................ P2001-104929

(51) Int. Cl.
*G02B 6/32* (2006.01)
*G02B 6/26* (2006.01)
*G02B 6/46* (2006.01)
*G02B 6/255* (2006.01)

(52) U.S. Cl. .............................. 385/34; 385/39; 385/96
(58) Field of Classification Search ................... 385/34, 385/74, 96, 24, 39, 52, 33
See application file for complete search history.

(56) References Cited

U.S. PATENT DOCUMENTS

| | | | | |
|---|---|---|---|---|
| 4,213,677 A * | 7/1980 | Sugimoto et al. | ............... | 385/34 |
| 4,475,935 A * | 10/1984 | Tanaka et al. | ................. | 65/407 |
| 4,558,217 A * | 12/1985 | Alves | ..................... | 250/227.23 |
| 4,701,032 A * | 10/1987 | Takada | ........................ | 359/654 |
| 4,957,343 A * | 9/1990 | Sato et al. | ...................... | 385/96 |
| 4,962,988 A * | 10/1990 | Swann | .......................... | 385/34 |
| 5,000,538 A * | 3/1991 | Jung et al. | ..................... | 385/96 |
| 5,109,298 A * | 4/1992 | Nishi | .......................... | 359/654 |
| 5,217,285 A * | 6/1993 | Sopori | ........................... | 362/1 |
| 5,221,996 A * | 6/1993 | Kikuchi | ........................ | 359/690 |
| 5,384,874 A | 1/1995 | Hirai et al. | | |
| 5,491,764 A * | 2/1996 | Hu et al. | ........................ | 385/24 |
| 5,719,495 A * | 2/1998 | Moslehi | .................... | 324/158.1 |
| 5,757,993 A * | 5/1998 | Abe | .............................. | 385/34 |
| 5,783,152 A * | 7/1998 | Nave | ........................ | 422/82.06 |
| 5,852,507 A * | 12/1998 | Hall | ............................ | 398/205 |
| 5,859,940 A * | 1/1999 | Takahashi et al. | ............. | 385/34 |
| 5,889,904 A * | 3/1999 | Pan et al. | ....................... | 385/24 |
| 5,949,585 A * | 9/1999 | Kittaka | ......................... | 359/654 |
| 6,139,196 A * | 10/2000 | Feth et al. | ...................... | 385/96 |
| 6,185,347 B1 | 2/2001 | Zheng | | |
| 6,347,170 B1 * | 2/2002 | Zheng | .......................... | 385/34 |
| 6,360,039 B1 * | 3/2002 | Bernard et al. | ................ | 385/33 |

(Continued)

FOREIGN PATENT DOCUMENTS

JP    55-4021 A  *   1/1980

(Continued)

*Primary Examiner*—Jared J. Fureman
(74) *Attorney, Agent, or Firm*—Darby & Darby PC (57) ABSTRACT

A collimator lens having a low reflectivity and significantly improved durability against high-power light is provided so that optical parts using the collimator lens can be reduced in size and cost lowered. A plurality of optical fibers can be connected to the collimator lens to produce a variety of fiber collimators and optical parts based on the fiber collimator. The collimator lens is made essentially of quarts glass whose refractive index is graded radially so as to increase towards the optical axis and decrease gradually towards the outer periphery. The collimator lens and optical fibers are connected directly by fusion.

9 Claims, 2 Drawing Sheets

U.S. PATENT DOCUMENTS

| | | |
|---|---|---|
| 6,542,665 B2 * | 4/2003 | Reed et al. .................... 385/34 |
| 6,546,168 B1 * | 4/2003 | Xie et al. ...................... 385/39 |
| 6,870,988 B2 * | 3/2005 | Liu .............................. 385/34 |
| 6,879,750 B2 * | 4/2005 | Chen et al. ................... 385/24 |
| 2002/0136498 A1 * | 9/2002 | Aldridge et al. .............. 385/52 |
| 2003/0179996 A1 * | 9/2003 | Fan .............................. 385/34 |
| 2004/0126059 A1 * | 7/2004 | Bhagavatula et al. ......... 385/33 |
| 2004/0151431 A1 * | 8/2004 | Ukrainczyk .................. 385/33 |

FOREIGN PATENT DOCUMENTS

| | | |
|---|---|---|
| JP | 58-216215 A * | 12/1983 |
| JP | 61-254923 A * | 11/1986 |
| JP | 63-172107 A | 7/1988 |
| JP | 05-009036 A | 1/1993 |

* cited by examiner

016
COLLIMATOR LENS, FIBER COLLIMATOR AND OPTICAL PARTS

BACKGROUND OF THE INVENTION

1. Field of the Invention

The present invention relates to a technology for optical coupling using a lens, and relates in particular to an optical fiber collimator, used in optical functional parts in optical communications field, for incidenting light from an optical fiber to an optical functional element, or coupling light from an optical functional element to an optical fiber.

2. Description of the Related Art

As the volume of communication activity continues to increase, the optical power propagating inside the fibers has also been increased in recent years due to increasing number of wavelength multiplexing as well as to increasing amplification level of optical amplifiers. Accordingly, durability for high power optical light is demanded in various optical parts. For example, there has been a demand to propagate high energy light of the order of several watts through optical fibers.

Optical durability is not too serious a concern when the light is propagating inside the optical fiber. This is because the optical fiber is composed of a quartz system, and optical absorption is quite low in the wavelengths band of propagating light.

In contrast, problems of optical durability of materials are experienced at the output and input sites where the light is exiting from the optical fiber and where the light is entering the optical fiber. Particularly, the input/output ends of the optical fiber where the beam is focused, the energy density is high and the materials are susceptible to damage. For this reason, high optical durability is demanded for such materials.

From such a viewpoint, a typical structure for affixing a lens to an optical fiber using an adhesive, disclosed in a U.S. Pat. No. 4,213,677, experiences degradation in optical properties when high power light is input, because of absorption of light by the adhesive agent and the consequent rise in temperature.

Optical adhesives in general exhibit absorption at a level of 1~5% in the wavelength region used for communications, and degradation temperature is, at best, about 400° C. Materials with such physical properties cannot endure optical power of the order of several watts.

In such cases, fusion splicing may be considered as a method of connecting an optical fiber to a lens without using optical adhesives that present problems of durability. However, it has been difficult in practice to splice lens and fiber by fusion.

One reason is that, to perform fusion splicing, it is necessary to heat both parts to be joined to a temperature in excess of the softening temperatures of both materials. However, lenses are conventionally made of multi-component type glasses, and their softening temperatures range from 500 to 600° C. On the other hand, optical fiber is made primarily of quartz glass, and its softening temperature is about 1700° C. The softening temperatures of the two components are quite far apart. For this reason, at a temperature sufficiently high to enable optical fiber to fuse, the shape of the lens having a lower softening point becomes severely distorted so that it has not been possible to prepare a join without causing some damage. Also, even if they are forced to fuse, the problem has been that the bonding strength suffers because of the differences in their coefficients of linear expansion and the resulting stresses introduced in the joint during cooling.

Also, as show in a U.S. Pat. No. 5,889,904, another solution proposed to the problem of joining is to arrange a space between an end surface of an optical fiber and an end surface of a lens. However, in this case, there is a problem of degradation of optical quality caused by foreign objects and the like that may be present on their surfaces. Also, because the two components are not directly spliced by adhesive and the like, a complex structure is required for fixing the positions of the two components, and it is difficult to lower the cost and reduce the size. Also, it is necessary to apply anti-reflection coating on each surface so that not only the cost is increased but a question of optical durability of anti-reflection coating must be addressed.

Also, as shown in a U.S. Pat. Nos. 4,701,011 or 5,384,874, a structure is proposed to use a GI (graded index) fiber as a collimator lens. GI fiber is an optical fiber that has a core portion whose refraction index varies in a parabolic manner. GI fiber is made of the same quartz material which is used for making optical fibers so that the two components can be fusion spliced, and the resulting joint can be expected to be durable against high power light.

However, in this case, the outer diameter of the GI fiber is 250 μm or less and is too small to be used practically for assembling of the collimator. Also, it becomes necessary to provide reinforcing members such as glass capillary tubing for protection of GI fibers so that it is difficult to lower the cost.

Further, in the U.S. Pat. No. 5,384,874 noted above, an optical collimator based on GI fiber is disclosed. However, a GI fiber used as a lens in this case and an opposing optical fiber to be joined are fixed in position coaxially. Therefore, to secure the degree of return loss allowed in optical communications, it becomes necessary that the lens end surface must be treated for reducing reflectivity using some method, such as applying an anti-reflection coating, so that it is difficult to lower the cost.

Also, optical collimators are used often for optical parts that have more than three input/output ports such as in dielectric multi layer thin film filter type optical multi/demultiplexers. A structure for joining three input/output ports is disclosed in a U.S. Pat. No. 4,213,677, in which two opposing GRIN (gradient index) type rod lenses are used to connect one side of the lens to two ports and the opposite side to one port. This structure is suitable for reducing the cost as well as the size of the optical part.

However, as described above, with optical collimators based on such fine diameter GI fibers of 125 μm size, it is difficult to splice two such fibers, and even if a joint can be made, this technique has a problem that it is difficult to decrease the insertion loss because the effective lens diameter is a maximum of 250 μm.

SUMMARY OF THE INVENTION

The present invention has been made to overcome the above problems, and accordingly, it is an object of the present invention to provide a collimator lens having improved durability for high power light when used at such locations as input/output sites of an optical fiber, in such a manner to reduce the size and achieve low cost, and to improve low reflection characteristics. Another object is to provide a collimator lens that enables to connect a plurality of fibers thereto, and a fiber collimator and optical parts based on the above collimator lens.

To solve the problems described above, the present invention provides a collimator lens comprised of quartz glass as a main component and having a refractive index distributed radially so as to gradually increase towards an optical axis thereof and decrease towards an outer periphery thereof.

The present collimator lens is comprised primarily of quartz glass so that when it is joined to an optical fiber or an optical waveguide, which are made primarily of quartz glass, the difference in the refractive indexes in the two components is small resulting in that the return loss at the joint interface is lowered.

Furthermore, splicing of the lens to optical fibers and waveguides comprised by quartz is facilitated and the joint strength is made stable. Especially, when the components are spliced by fusion, a problem of excessive softening of one component that results in severe distortion of the component shape is not experienced. Also, a problem is not experienced in the loss of joint strength due to weakening introduced by differential thermal stresses caused during cooling by mismatched thermal expansion coefficients of the components.

Also, because a cladding layer is not included as it is in GI fibers, and grading of refractive indexes are achieved gradually through the body of the material from the optical axis to the outer periphery, the joint area can be made sufficiently large without detracting from the aim of making a compact device.

In the present invention, it is preferable that an outer diameter of the collimator lens is 0.3 mm or more. By so doing, it becomes possible to connect two single-core optical fibers, having an outer diameter of 125 µm, without losing the optical performance of the assembly. Also, it is preferable that an outer diameter of the collimator lens is 1.9 mm or less. If the outer diameter is 1.9 mm, two optical fibers can be connected without losing the optical performance, even if the outer diameter of coating of the fiber is 0.9 mm. If the collimator lens diameter is 1.9 mm or less, it does not conflict with the need to reduce the overall size of the optical part.

The present inventors provide a fiber collimator comprising an optical fiber joined to the collimator lens according to the present invention. In this case, a method of direct fusion splicing is most preferable, but it is possible to use an adhesive.

According to the present invention, because the collimator lens is made primarily of quarts glass, difference in refractive index compared with an optical fiber, which is made primarily of quarts glass, is low so that the return loss at the joint interface can be decreased.

Also, because the collimator lens is made primarily of quarts glass, connecting to an optical fiber made primarily of quarts glass is not only facilitated but also the joint strength can be maintained steadily.

Also, because the area of the joint surface of the collimator lens can be made sufficiently large, it is possible to join the collimator lens to an optical fiber without losing optical performance.

In the fiber collimator of the present invention, it is preferable that the optical fiber and the collimator lens are spliced directly by fusion. In this case, because the material is the same for the collimator lens and optical fibers to be joined so that there is no difference in their softening point. Therefore, there is no problem of softening of one component due to excessive heating to result in severe shape distortion. Also, because there is no difference in their coefficients of linear expansion, weakening of the joint strength due to stresses generated during cooling is not experienced.

According to the present invention, because an adhesive is not used, it is possible to obtain resistance to high power light at the joint interface.

In the fiber collimator of the present invention, it is preferable that an optical axis of the optical fiber and an optical axis of the collimator lens are separated radially by 5 µm or more in a joint plane.

According to the present invention, the optical fiber is connected to the collimator lens by offsetting the optical axis of the optical fiber from the lens optical axis, resulting that reflected light from the opposite surface of the fiber connected lens surface is focused at a point symmetric with respect to the optical axis. For this reason, high return loss can be achieved.

The present inventors provide an optical part having an optical functional element inserted between two fiber collimators lenses, wherein at least one of the two fiber collimators is the fiber collimator according to the present invention.

The optical part in this invention is termed an inline-type, and the element to be inserted can be one element or a combination of elements chosen from a group that include a dielectric multi layer thin film filter element, an isolator element, a circulator element and an amplifier gain equalizer.

The present inventors also provide an optical part comprised by a substrate-type waveguide joined to the collimator lens according to the present invention. In this case, it is most preferable to employ fusion splicing, but an adhesive may also be used.

According to the present invention, because the collimator lens is made primarily of quarts glass, difference in refractive index compared with a substrate-type waveguide which is made primarily of quarts glass is low so that the reflection at the joint interface can be decreased.

Also, because the collimator lens is made primarily of quarts glass, joining to a substrate-type waveguide which is made primarily of quarts glass is not only facilitated but also the joint strength can be maintained steadily.

In the optical part of this invention, it is preferable that the substrate-type waveguide and the collimator lens are spliced directly by fusion. In this case, because the materials are the same for the collimator lens and the substrate-type waveguide to be joined so that there is no difference in their softening point. Therefore, there is no problem of softening of one component due to excessive heating to result in severe shape distortion. Also, because there is no difference in their coefficients of thermal expansion, weakening of the joint strength due to stresses generated during cooling is not experienced.

According to this invention, because an adhesive is not used, it is possible to obtain resistance to high power light in the joint interface.

The present inventors also provide an optical part comprised by a substrate-type waveguide joined to an optical fiber through the collimator lens according to the present invention. In this case, it is most preferable to employ fusion splicing, but an adhesive may also be used.

According to the present invention, because the collimator lens is made primarily of quarts glass, difference in refractive indexes compared with a substrate-type waveguide and the optical fiber, both of which are made primarily of quarts glass, is low so that the return loss at the joint interfaces can be decreased.

Also, because the collimator lens is made primarily of quarts glass, joining to a substrate-type waveguide and to an optical fiber, both of which are made primarily of quarts glass, is not only facilitated but also the joint strength can be maintained steadily.

In the optical part of this invention, it is preferable that splicing of the substrate-type waveguide to the collimator lens as well as splicing of the optical fiber to the collimator lens are carried out by fusion. In this case, because the materials are the same for the collimator lens and the substrate-type waveguide as components to be connected to the optical fiber, so that there is no difference in their softening point. Therefore, there is no problem of softening of one component due to excessive heating to result in severe shape distortion. Also, because there is no difference in their coefficients of thermal expansion, weakening of the joint strength due to stresses generated during cooling is not experienced.

According to this invention, because an adhesive is not used, it is possible to obtain resistance to high power light in the joint interface.

The present inventors also provide an optical part comprised by a light emitting element and the fiber collimator according to the present invention, wherein a collimator lens of the fiber collimator is placed in a location that can receive light output from the light emitting element.

Also provided is an optical part comprised by a light receiving element and the fiber collimator according to the present invention, wherein the light receiving element is placed in a location that can receive light output from the collimator lens of the fiber collimator.

According to these aspects of the present invention, because an adhesive is not used in joining the optical fiber to light emitting element or to light receiving element, it is possible to obtain resistance to high power light in the joint interface.

In summarizing the features of the present invention as described above, optical durability for high power input/output for optical fiber connections is increased significantly, and the size of overall devices is decreased and the cost is lowered. The return loss at the joint interfaces is reduced also. It is also possible to connect a plurality of optical fibers to one collimator lens while maintaining high optical performance. For this reason, it is possible to provide various optical parts having superior resistance to high power light as well as to reduce the size and lower the cost of the optical parts, in addition to providing reduced reflection through the optical parts.

DESCRIPTION OF THE PREFERRED EMBODIMENTS

In the following, preferred embodiments of the present invention will be explained but the present invention is not limited to the embodiments presented.

Collimator Lens

A collimator lens in this embodiment is a gradient-index type rod lens, comprised primarily of quarts glass, that has a distribution of indexes of refraction formed within the lens. The ideal state of refractive index distribution within the lens is expressed in formula (1).

$$n^2(r) = n_0^2 \text{sech}^2(gr) = n_0^2(1-(gr)^2 + h_4(gr)^4 + h_6(gr)^6 + \ldots) \quad (1)$$

where n is a refractive index, $n_0$ is a refractive index at the lens center axis (optical axis), r is a radial distance from the lens center axis, g is a magnitude of change in the refractive index, and h is a coefficient for a higher order terms. Here, higher order terms become important in improving the lens performance.

It should be further mentioned that common distributed-index-type lenses are made by using ion exchange technique on a flint glass to form a lens structure having a distribution of refractive indexes, and the loss in the lens itself is 0.02 dB/cm in a 1.5 μm wavelength band. In contrast, in lenses made of quarts glass, the loss is 0.00002 dB/cm which is orders of magnitude smaller, so that an improvement in the insertion loss may be expected. In addition, because the temperature rise caused by absorption of high power input light by the material is lower by orders of magnitude, it is obvious that such an approach is advantageous not only for preventing degradation in the optical performance caused by temperature rise due to continual input of high power light but also for improving the long-term reliability.

<Method of Manufacturing the Collimator>

A method of obtaining the collimator lens is to control the grading of refractive index by Ge doping, which is used generally in manufacturing optical fibers. In this case, methods such as VAD (vapor-phase axial deposition), OVD (outside vapor deposition), MCVD (modified chemical vapor deposition), PCVD (plasma-activated chemical vapor deposition) may be considered, but it is preferable to manufacture using PCVD that provides superior control over the refractive indexes. The method of manufacturing the collimator lens using PCVD will be explained in detail in the following.

PCVD is a type of CVD (chemical vapor deposition) technique that produces a glassy deposit of a desired refractive index on the inside surface of a quartz tubing, and for deposition reaction, a plasma is generated on the inside surface of the glass tubing to carry out oxidation of the feed gas with oxygen gas. Specific manufacturing steps are as follows.

That is, the starting tube is a quartz tubing, and a feed gas comprised by silicon tetrachloride ($SiCl_4$), for forming quarts glass, and another feed gas comprised by germanium tetrachloride ($GeCl_4$), for raising the refractive index, and oxygen gas ($O_2$) are delivered into the quartz tubing, where microparticles of a glassy deposit having a desired refractive index are generated and deposited on the inside surface by the vapor phase oxidation reaction activated by the plasma action. The reaction in this case is represented by the following formula (2).

$$SiCl_4 + O_2 \rightarrow SiO_2 + SCl_2$$

$$GeCl_4 + O_2 \rightarrow GeO_2 + 2Cl_2 \qquad (2)$$

During the process, the quartz tubing is rotated so that deposition takes place uniformly around the circumference of the quartz tubing. Further, uniform deposition in the longitudinal direction of the quartz tubing is promoted by moving the plasma in the longitudinal direction.

Then, the deposition operation is repeated for each layer by adjusting the refractive index for each layer, thereby obtaining a distribution of refractive index in the radial direction. Specifically, deposition of a graded structure having different refractive indexes is produced by adjusting the ratio of germanium tetrachloride in the feed gas for each layer.

After completing the deposition operation, by heating the quartz tubing having a glass deposition to about 2000° C., viscosity of the quartz tubing is lowered and the tubing collapses towards the center of the tubing, thus forming a preform of a rod shape. This processing step is termed "collapse". This preform is heated in an electric furnace to produce a fused state, and is drawn until a desired diameter is obtained. After this step, drawn glass rod is cut into a specific length and the end surfaces are polished to complete the production of the collimator lenses of the present invention.

This process of PCVD produces superior control over the refractive indexes. The reasons are as follows.

First, the PCVD process causes the oxidation reaction by heating the feed gases directly by means of plasma. For this reason, nearly 100% of Ge which is added for raising the refractive index can be oxidized under stable conditions.

Also, the PCVD process enables to produce a very thin layer of deposition during one glass deposition step. In other words, refractive indexes can be controlled in very fine gradations, the state of distribution of grading pattern can be made, as nearly as possible, to approach the ideal shape.

The reason that the deposition thickness per pass is low is that the heat source is plasma so that the concentration of the feed gas cannot be made high as in the MCVD process. Therefore, film forming speed is slower than that in the MCVD process.

Accordingly, because the control of refractive indexes is superior, there is no need for a post-deposition correction step to adjust the distribution pattern after a refractive index distribution has been generated.

In the PCVD process, there is a concern that a phenomenon of "center dip" may occur, which causes the radial refractive index grading in the center to be low because of dopant scattering in the center section due to collapsing of the preform, thereby causing higher insertion loss.

Figure 1:
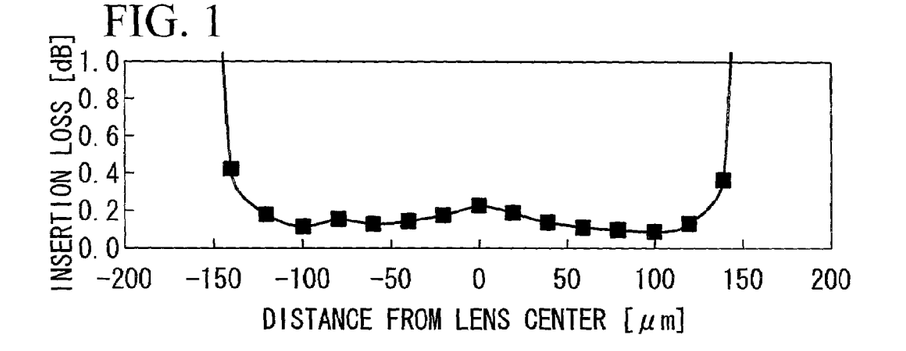
FIG. 1 is a graph showing the results of insertion loss of a collimator lens on the input light location in an embodiment of the present invention.

Therefore, insertion loss between two collimator lenses produced by the PCVD process was examined using two lenses having an outer diameter of 0.4 mm and a fiber diameter of 125 μm (10 μm core diameter). The results, shown in FIG. 1, indicated that the insertion loss was 0.2 dB or less which is almost negligible so that it was clear that performance degradation due to center dip is kept in a range that can be ignored.

Another method of obtaining a distribution of refractive indexes is by MCVD process. This process differs from the PCVD process in heating of the feed gasses which is carried out by applying a flame of a burner to the outside the glass tubing.

In the MCVD process, the inner section is heated by heating the tubing from outside to cause oxidation reaction so that temperature gradient is high and the extent of oxidation reaction is not as stable as in PCVD process. For this reason, control of gradation in refractive index is not as good as that in the PCVD process. However, because the feed gas concentration can be increased in MCVD process, it is possible to form a film in a shorter time. It is also possible to obtain a degree of control of refractive index to near that in the PCVD process, if the feed gas concentration is kept low. Therefore, it is possible to manufacture collimator lenses of superior optical performance at low cost by using the MCVD process.

<Method of Splicing Collimator Lens to Optical Fiber and the Like>

Next, methods of splicing the collimator lens of this embodiment to an optical fiber and a substrate-type waveguide will be explained.

The collimator lens of this embodiment is comprised primarily of quarts glass so that it is possible to carry out direct fusion splicing to optical fibers and substrate-type waveguide. Heating means for direct fusion splicing is either arc discharge or $CO_2$ laser and the like. In this case, local heating is possible so that unwanted heating of sections other than the fusion region can be controlled. Therefore, distortion and other problems caused by heating can be kept to a minimum.

When the joints are produced by direct fusion, optical durability for high power light is increased because the use of adhesive becomes unnecessary.

<Inline Type Optical Parts>

Figure 2:
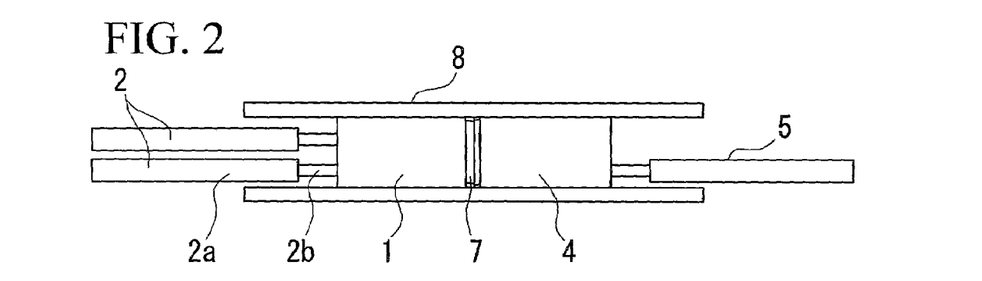
FIG. 2 is a schematic diagram of the structure of an inline type optical part in an embodiment of the present invention.

FIG. 2 shows a schematic diagram of an inline-type optical part according to this embodiment. The optical part in this embodiment is comprised by components shown in FIG. 2: Reference numeral 1 denotes a collimator lens and 2 optical fibers, and one fiber collimator is comprised by the collimator lens 1 and optical fibers 2 connected directly thereto by fusion. Similarly, reference numeral 4 denotes a collimator lens and 5 an optical fiber, and other collimator is comprised by the collimator lens 4 and the optical fiber connected directly thereto by fusion. An optical functional element 7 is inserted between the two collimator lenses 1, 4 of respective fiber collimators, and the entire assembly is housed in a casing 8.

The optical functional element 7 inserted is an element chosen from a group of elements that includes a dielectric multi layer thin film filter element, an isolator element, a circulator element or an amplifier gain equalizer for example, or a composite element that combines two or more such elements.

The inline-type optical part in this embodiment is durable against high power light because the fiber collimators 1, 4 are made primarily of quarts glass and are spliced to the optical fibers 2, 5 directly by fusion.

<Collimator Lens Outer Diameter>

Next, the results of examining the effects of the outer diameter of the collimator lenses will be explained. Outer diameter of ordinary optical fiber is about 125 μm and the core diameter is about 10 μm. From these dimensions, it can be concluded that a lens having a minimum outer diameter of about 135 μm would be about adequate for attaching 2 cores. However, after some examination, it was found that a lens must have an outer diameter of 300 μm (0.3 mm) or more to enable to attach a plurality of fibers to one collimator lens and to maintain superior optical performance.

The reason is that, when a beam of light propagating inside the lens spreads out to a region near the outer edge of the lens, it becomes difficult to maintain superior optical performance due to the effect of aberrations caused by discontinuity in the refractive index distribution.

Figure 3:
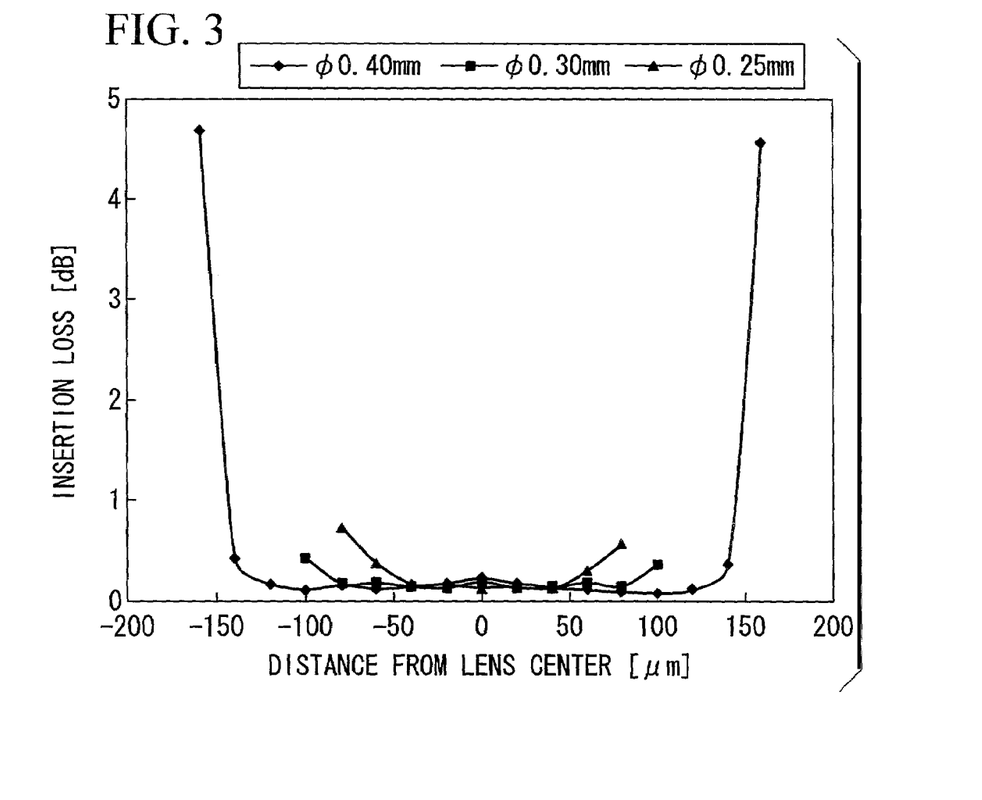
FIG. 3 is a graph showing the results of insertion loss of a collimator lens on the input light location according to variations in the outer diameter of the collimator lens in an embodiment of the present invention.

FIG. 3 shows the results of study of the effects of distance from the center of a lens on insertion loss, using lens diameters of 250, 300 and 400 μm. As shown in FIG. 3, in a collimator lens of 250 μm diameter, the insertion loss begins to increase from a location about 50 μm away from the center of the lens. Therefore, the width of a region having low insertion loss is 100 μm or less at the widest location. When it is desired to connect two optical fibers of about 125 μm diameter, a region required for insertion of a core occupies a width of at least 135 μm. It follows that when using a 250 μm collimator lens, it is not possible to contain two such optical fibers within the low-loss region.

On the other hand, when using a 300 μm diameter collimator lens, insertion loss is not generated even at a location beyond 75 μm from the center of the lens. In this case, the width of the low-loss region can be secured at 150 μm at the widest location.

When using a 400 μm diameter lens, insertion loss is not generated even at a location beyond 100 μm. In this case, the width of the low-loss region can be secured at 200 μm or more at the widest location.

Accordingly, in the cases of a 300 μm diameter lens and a 400 μm diameter lens, the cores of two optical fibers of 125 μm can be connected within the low-loss region of the lens.

That is, when connecting two optical fibers to one lens, it can be understood that it is necessary to provide a lens having a diameter of 300 μm (0.3 mm) or more in order to maintain superior optical performance.

Similarly, a study was carried out to find an outer diameter of the collimator lens that would permit connecting two optical fibers having a 0.9 mm outer diameter and coated by nylon without loss of optical performance.

In this case, when two optical fibers of about 125 μm diameter are placed in contact with each other at the joint surface, because the outer diameter of the optical fiber is 0.9 mm, bending loss is experienced by the fibers. Also, if the bent portion is lengthened to avoid such a bending loss, it works against the requirement for reducing the size. Therefore, the ideal structure would be to have no bent portion. To construct a structure that does not have a bend, it is necessary to space the fiber centers at a distance of about 1.0 mm.

Further, when the tolerance of the fiber outer diameter and degradation of optical characteristics at the outer region of the lens are considered, it was found that it is necessary to have an outer lens diameter of 1.2 mm or more to connect two optical fibers of 0.9 mm.

To examine the requirements for the outer diameter of a collimator lens, it is necessary to consider the outer diameter of the optical fiber to be connected to the lens. The reason is that even if a collimator lens of extremely small diameter can be made, the outer diameter of the optical part itself is restricted by the outer diameter of the optical fiber. For this reason, it is difficult to reduce the overall size of the final product of the optical part by simply reducing the collimator lens size. Manufacturing is facilitated and packaging of the optical parts is simplified if the outer diameter of the collimator lens is made equal to that of the optical fiber.

The optical part shown in FIG. 2 is an example of simplified packaging by making the outer diameter of the part equal to the outer diameter of the collimator lens.

Here, the requirement for the outer diameter of the collimator lenses 1, 4 will be examined when the outer diameter of the covered section 2a of each optical fiber 2 is 250 μm and the outer diameter of each bare fiber section 2b is 125 μm.

In this case, it is necessary to allow a minimum of about 550~600 μm for the inner diameter of the casing 8, because the size of the lens must be large enough to equal two covered sections 2a laid side by side plus some extra space.

Also, because the casing 8 should not be made larger than is necessary, the lenses 1, 4 must have an outer diameter that is equal to or less than the inner diameter of the casing 8. On the other hand, the lenses 1, 4 are held inside the casing 8 more firmly when the inner diameter of the casing 8 is made substantially equal to the outer diameters of lenses 1, 4.

Therefore, it is most desirable that the inner diameter of the casing 8 and the outer diameters of the collimator lenses 1, 4 are within a range of 550~600 μm.

Next, the requirement for the outer diameter of the collimator lenses 1, 4 in a case of connecting two optical fibers having a respective outer diameter of 0.9 mm will be examined.

In this case, the outer diameter of the optical fiber is thick so that direct insertion into the casing is possible, and therefore, it is necessary that the outer diameter be 1.9 mm or more which is equal to a value of two optical fibers laid side by side plus some extra space for insertion.

In this case also, it is desirable that the outer diameters of the collimator lenses be substantially the same as the inner diameter of the casing.

Therefore, it is most desirable that the inner diameter of the casing and the outer diameters of the lenses be both about 1.9 mm.

Accordingly, the collimator lens of this embodiment enables to facilitate assembling and reduce the materials cost because of its simplified packaging to match the lens outer diameter to the outer diameter of the optical fiber. Additionally, because the lens diameter is optimized in relation to the outer diameters of the optical fiber, there is no tendency to increase the size of the final product. The optimum outer diameter is obtained by the following formula (3).

$$\text{optical fiber o.d.} \times \text{no. of optical fibers connected to one lens} + 50\text{-}100 \text{ μm} \qquad (3)$$

<The Length of Collimator Lens>

Next, the requirements for the length of collimator lens will be examined. The length of collimator lens should be short from a general viewpoint of reducing the overall size of the optical part, but there are some restrictions.

For example, a lens of 1 mm or less length and having a lens outer diameter equal to the fiber diameter presents some serious problems in assembling. For this reason, reinforcing by such as glass capillary is required to assist in assembling the part, so that the final size of the product increases, which is contrary to the original aim.

Further, if the lens is too short, the lens length for obtaining collimated light must be adjusted within a dimensional tolerance at submicron levels, and such precision fabrication required affects the yield for the short lens, and it is difficult to reduce the cost.

Therefore, it is preferable that the length of the collimator lens in this embodiment be 1 mm or larger.

<Collimator Lens and Fiber Connecting Location>

A feature of the fiber collimator in this embodiment is that an optical fiber is intentionally connected to a location offset from the optical lens axis so as to conveniently obtain low reflectivity. In the case of an optical collimator part, there are two reflection points (surfaces). One is at the connect surface between the optical fiber and the lens, and other is at an open surface of the lens.

Because the main constituent of the collimator lens is quarts glass, the refractive index at the interface between the optical fiber and the lens is low. Therefore, reflection from the connect interface between the optical fiber and the lens can be quite small. And, by offsetting the optical fiber from the optical lens axis, it is possible to have a lens design so that the difference in the refractive indexes in the optical fiber and lens at the connect interface is substantially zero. Further, when connecting a single-core fiber to the lens, fusion splicing can easily achieve return loss of −60 dB or less.

On the other hand, regarding reflection from the open surface of the lens, by offsetting the optical axes of the optical fiber and the lens, lens characteristics are such that reflection from the open end surface is focused at a location of the lens surface in a point symmetry of the optical axis and not at the location of light input fiber. Accordingly, high return loss can easily be achieved.

As shown in formula (1), in the case of a gradient-index type lens, parallel light is obtained by designing the lens pitch so that it is an odd multiple of 0.25, which is shown in formula (4).

$$0.25\ (1+2n)\ \text{where n is a positive integer} \quad (4)$$

In this case, the pitch length of reflection light focusing on the input surface is twice the pitch distance of the lens. If the total pitch length is an odd multiple of 0.5, reflection light is focused at a point symmetrical to the light input point about the optical lens axis. That is, as shown in formula (4), because light is focused at a pitch length which is twice an odd multiple of a 0.25 pitch so that the focal point is always an odd multiple of 0.5 so that it can be understood that reflection is focused at a location symmetrical to the light input location with respect to the optical lens axis, as shown in the following relation:

$$0.25\ (1+2n)\times 2=0.5\times(1+2n)\ \text{where n is a positive integer.}$$

Figure 4:
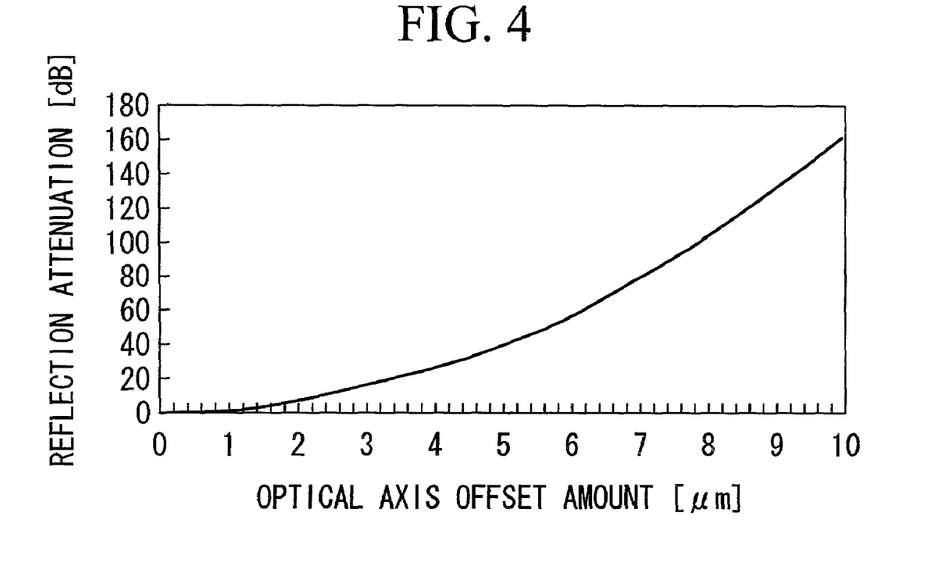
FIG. 4 is a graph showing a relation of the amount offsetting and return loss.

In this case, the amount necessary for offsetting is determined by the return loss required of an optical functional part. At this time, a minimum of 40 dB loss is required, and to secure this level of return loss, it is necessary to offset from the optical axis by at least 5 μm assuming the worst case of the lens open surface being oriented at right angles to the optical axis. The relation of the offset amount to return loss is expressed by formula (6).

$$T_{RL} = \exp\left[\frac{2d^2}{W_1^2 + W_2^2}\right] \quad (6)$$

where $W_1$ is a mode field radius of input light, $W_2$ is a mode field radius of reflection light in the light input cross sectional surface, d is an offset value. FIG. 4 shows a graph of a relation of offset amount to the return loss when a common single mode fiber is used.

Further, because the collimated light from the optical collimator is not output parallel to the optical lens axis by offsetting the fusion point, but is output at an angle θ that is dependent on the degree of offsetting, optical performance degradation due to multiple reflections between optical function element and opposing optical collimator end surface does not take place. Even when anti-reflection coating is applied to obtain return loss and reducing reflection losses, it is clear that higher return loss is obtained compared with the case of coaxial joining of lens and optical fiber.

<Substrate-type Optical Waveguide Parts>

In designing a substrate-type optical waveguide, it has been a basic concept to match a mode field diameter (MFD) of the substrate-type waveguide to an MFD (about 10 μm) of an optical fiber to reduce the connection loss.

However, because the functions required of the substrate-type waveguide in recent years have become more complex (higher integration, multi-functionality), the conventional design approach to match the fiber MFD leads to enlarging the overall circuit size so that the result is not only against the need for size reduction but also an increased cost of manufacturing.

Therefore, a trend is to further increase the differential between waveguide MFD and fiber MFD and reduce the minimum radius at the bending section in an effort to reduce the circuit size and lower the cost. In doing so, as a method of resolving the connection loss caused by differences in MFDs, a lens is being inserted between optical fiber and substrate-type waveguide.

The collimator lens in this embodiment is also suitable as an insertion lens between a substrate-type waveguide and optical fibers. In this case, the collimator lens in this embodiment can be directly fusion spliced to the substrate-type waveguide also because the primary constituent in the collimator lens is quarts glass. It is obvious that the opposing surface of the lens spliced to the waveguide can also be spliced to another optical fiber by fusion splice.

In this case, the joint is durable against high power light because the joint can be produced without using adhesive or anti-reflection coating.

Also, because the connection can be made without providing a space between the substrate-type waveguide and optical fibers, problems of degradation of optical performance caused by foreign particles on the surfaces are not created. Also, because of direct fusion splicing, complex arrangement for fixation of relative positions is not required. Therefore, it enables low cost and size reduction.

Also, because the body of the collimator lens is small, a collimator array of high-density and small size can be manufactured by arranging the lenses in a V-grooved substrate and the like, which can be connected to a substrate-type waveguide or optical fibers.

<Optical Part Using Light Emitting Element>

Figure 5:
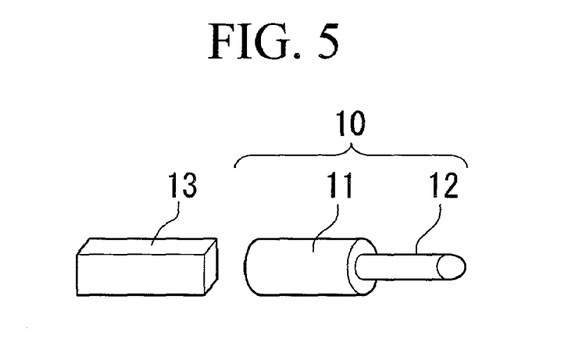
FIG. 5 is a schematic diagram of an optical part based on a light emitting element according to an embodiment of the present invention.

FIG. 5 shows an optical part in this embodiment for connecting a light emitting element and an optical fiber. An optical part shown in FIG. 5 is comprised by a fiber collimator 10 and a light emitting element 13, and the fiber collimator 10 is constructed by fusion splicing the collimator lens 11 to an optical fiber 12. The collimator lens 11 is placed in a location that can receive the light output from the light emitting element 13.

The optical part according to this embodiment enables to significantly improve optical durability for light input from the light emitting element.

Here, if optical durability is the only objective, a method is available to form the end of a fiber directly into a shape such as spheroidized-tip fiber that can perform lens functions. However, it is difficult to fabricate such extremely small diameter fibers of 125 μm into a precise shape. For this reason, this method generally produced low coupling efficiency.

The optical part in this embodiment enables to secure optical durability first and then to improve coupling efficiency.

<Optical Part Using Light Receiving Element>

Figure 6:
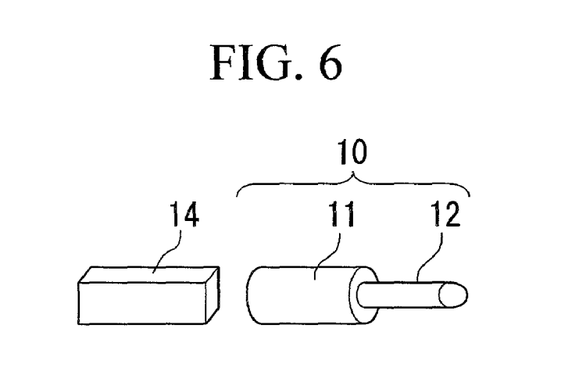
FIG. 6 is a schematic diagram of an optical part based on a light receiving element according to an embodiment of the present invention.

FIG. 6 shows an optical part in this embodiment for connecting a light receiving element and an optical fiber. The optical part shown in FIG. 6 is comprised by a fiber collimator 10 and a light receiving element 14, and the fiber collimator 10 is constructed by fusion splicing the collimator lens 11 of this embodiment to an optical fiber 12. This light receiving element 14 is placed in a location that can receive the light output from the collimator lens 11.

The optical part according to this embodiment enables to significantly improve optical durability for light input into the light receiving element.

<Collimator Lens Part for Light Input/Output in Free-Space Type Optical Switch>

Free-space type optical switch is used to switch light in the space external to a waveguide, and a widely used system is known as MEMS (micro electromechanical systems). The optical part in this embodiment utilizes the collimator lens in this embodiment for input/output of light in such a free-space type optical switch. The collimator lens and the optical fiber are directly fusion spliced to constitute a fiber collimator.

The optical part according to this embodiment enables to significantly improve optical durability for input/output light because the collimator lens and the optical fiber can be fusion spliced directly.

What is claimed is:

1. An optical part comprising:
   an optical fiber having a covered section and a bare end section which is made primarily of quartz glass;
   a collimator lens which comprises quarts glass as a main component that has a refractive index which varies with proximity to an optical axis thereof so as to gradually increase towards the optical axis and decrease away from the optical axis; and
   a cover member for covering an outer periphery of the collimator lens,
   wherein an end face of the bare end section of the optical fiber and the collimator lens are joined directly by fusion, the cover member covers the bare end section of the optical fiber via a space, and the entire bare end section of the optical fiber in a longitudinal direction of the optical fiber is positioned within the cover member in the longitudinal direction of the optical fiber.

2. An optical part according to claim 1, wherein an optical axis of said optical fiber and an optical axis of said collimator lens are distanced radially by 5 μm or more in a joint plane.

3. An optical part according to claim 1, two collimator lenses are provided, at least one of the two collimator lenses is the collimator lens according to claim 1, and an optical functional element is inserted between the two collimator lenses.

4. An optical part according to claim 1, wherein a light emitting element is provided, and said collimator lens is placed in a location that receives light output from the light emitting element.

5. An optical part according to claim 1, wherein a light receiving element is provided, and said light receiving element is placed in a location that receives light output from the collimator lens.

6. An optical part according to claim 1, wherein two optical fibers are provided, and said two optical fibers are joined to an end of said collimator lens within an area having low insertion loss, and an optical axis of each of said optical fibers and an optical axis of said collimator lens are spaced radially by 5 μm or more in ajoint plane.

7. An optical part according to claim 1, wherein said collimator lens is cylindrical over its entire length.

8. An optical part according to claim 1, wherein a part of the collimator lens to which the end face of the bare end section of the optical fiber is joined is flat.

9. An optical part according to claim 1, wherein the end face of the bare end section of the optical fiber is flat.

* * * * *